United States Patent
Jurzak et al.

(10) Patent No.: US 10,111,058 B2
(45) Date of Patent: Oct. 23, 2018

(54) METHOD, DEVICE, AND SYSTEM FOR TRANSMITTING SHORT DATA DURING AN ACTIVE CALL BY A DUAL WATCH SUBSCRIBER UNIT

(71) Applicant: MOTOROLA SOLUTIONS, INC, Chicago, IL (US)

(72) Inventors: Pawel Jurzak, Cracow (PL); Piotr Kuzio, Cracow (PL); Grzegorz Szyszka, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 8 days.

(21) Appl. No.: 15/546,776

(22) PCT Filed: Mar. 18, 2015

(86) PCT No.: PCT/PL2015/050006
§ 371 (c)(1),
(2) Date: Jul. 27, 2017

(87) PCT Pub. No.: WO2016/148591
PCT Pub. Date: Sep. 22, 2016

(65) Prior Publication Data
US 2018/0027396 A1  Jan. 25, 2018

(51) Int. Cl.
*H04L 1/08* (2006.01)
*H04L 1/18* (2006.01)
(Continued)

(52) U.S. Cl.
CPC ............. *H04W 4/16* (2013.01); *H04L 1/08* (2013.01); *H04W 84/08* (2013.01); *H04L 1/1835* (2013.01); *H04W 88/06* (2013.01)

(58) Field of Classification Search
CPC ............ H04L 1/08; H04W 4/16; H04W 88/06
See application file for complete search history.

(56) References Cited

U.S. PATENT DOCUMENTS 5,812,952 A * 9/1998 On .................... H04W 84/08
370/280
7,656,838 B2 * 2/2010 Fauconnier ....... H04W 72/1226
370/230

(Continued)

FOREIGN PATENT DOCUMENTS

EP  2678964 B1  12/2014

OTHER PUBLICATIONS

Wei Qi et al: "Design of TETRA-based Dedicated Radio Dispatching System of Urban Rail Transit", Intelligent System Design and Engineering Applications (ISDEA), 2013 Third International Conference on, IEEE, Jan. 16, 2013 (Jan. 16, 2013), pp. 574-578, XP032327676, DOI: 10.1109/ISDEA.2012.140.

(Continued)

*Primary Examiner* — Babar Sarwar (57) ABSTRACT

A dual watch subscriber unit (SU) in a wireless communication system transmits short data during an active call in response to a request to transmit short data. The SU transmits, via a transceiver at the SU, pending short data on an inbound data channel of an inbound traffic frequency. One of prior to or after transmitting the short data, the SU substantially simultaneously receives: via a first receiver of the transceiver, missed communication media of the active call missed during transmitting of the pending short data on a first outbound channel of a first outbound traffic frequency; and via a second receiver of the transceiver, second communication media of the active call, transmitted prior to or after the missed communication media of the active call, on a second outbound channel of a second outbound traffic frequency. The SU then plays back media from the missed and second communication media.

20 Claims, 5 Drawing Sheets

(51) Int. Cl.
*H04W 4/16* (2009.01)
*H04W 84/08* (2009.01)
*H04W 88/06* (2009.01)

(56) References Cited

U.S. PATENT DOCUMENTS

| | | | |
|---|---|---|---|
| 2004/0114598 A1* | 6/2004 | Veerepalli | H04L 1/1829 |
| | | | 370/394 |
| 2004/0184461 A1* | 9/2004 | Forssell | H04L 12/2854 |
| | | | 370/395.2 |
| 2015/0023227 A1* | 1/2015 | Khoo | H04L 5/14 |
| | | | 370/280 |
| 2015/0043539 A1* | 2/2015 | Senese | H04W 4/20 |
| | | | 370/335 |
| 2016/0143031 A1* | 5/2016 | Szyszka | H04W 4/20 |
| | | | 370/336 |
| 2017/0208444 A1* | 7/2017 | He | H04W 4/10 |

OTHER PUBLICATIONS

"Terrestrial Trunked Radio (TETRA); Technical requirements specification; Managed Direct Mode Operation (DMO); TR 101 661",IEEE, LIS, Sophia Antipolis Cedex, France, vol. TETRA-1, No. VI.1. 1,Apr. 1, 1999 (Apr. 1, 1999), XP014004941.

The International Search Report and the Written Opinioin, corresponding patent application No. PCT/PL2015/050006 filed: Mar. 18, 2015.

"Terrestrial Trunked Radio(TETRA); Voice plus Data(V+D); Designers' guide; Part1: Overview, technical description and radio aspects", ETSI Technical Report ETR 300-1, May 1997, all pages.

* cited by examiner

METHOD, DEVICE, AND SYSTEM FOR TRANSMITTING SHORT DATA DURING AN ACTIVE CALL BY A DUAL WATCH SUBSCRIBER UNIT

BACKGROUND OF THE INVENTION

Wireless communication systems provide for radio communication links to be arranged within the system between pluralities of user terminals. Such user terminals may be mobile and may otherwise be known as subscriber units. At least one other terminal, e.g. used in conjunction with subscriber units, may be a fixed terminal, e.g. a control terminal, base station, or access point. Such a system typically includes a system infrastructure that generally includes a network of various fixed installations such as base stations, which are in direct radio communication with the subscriber units. Each of the base stations operating in the system may have one or more transceivers which may, for example, serve subscriber units in a given local region or area, known as a 'cell' or 'site', by radio frequency (RF) communication. The subscriber units that are in direct communication with a particular base station are said to be served by the base station, and all radio communications to and from each subscriber units within the system are made via respective serving base stations. Sites of neighbouring base stations in a wireless communication system may be offset from one another or may be overlapping.

Wireless communication systems may operate according to an industry standard land subscriber unit (LMR) protocol such as, for example, the Project 25 (P25) standard defined by the Association of Public Safety Communications Officials International (APCO), the Digital Subscriber unit (DMR) standard, Terrestrial Trunked Radio (TETRA) or other radio protocols. Communications in accordance with DMR, P25, TETRA, or other standards may take place over physical channels in accordance with one or more of a TDMA (time division multiple access) protocol, a FDMA (frequency divisional multiple access), or other protocol. Subscriber units in wireless communication systems such as DMR systems send and receive user communicated voice data (e.g., voice or audio alone or multiplexed with other data such as video or image data) and non-voice data (e.g., location data or sensor data, status updates, control signalling, etc.), herein referred to collectively as 'traffic information', in accordance with the designated protocol.

Furthermore, LMR systems may operate in either a conventional or trunked configuration. In either configuration, a plurality of subscriber units may be partitioned into separate groups of subscriber units, such that subscriber units may selectively participate in individual (subscriber unit to subscriber unit) calls and also in group (subscriber unit to many subscriber units) calls.

In a conventional system, each subscriber unit in a group is selected to a particular FDMA frequency for communications associated with that subscriber unit's group. Thus, each group is served by one frequency (e.g., channel), and multiple groups may share the same single frequency (in which case, in some embodiments, group IDs may be present in the group data to distinguish between groups using the same shared frequency). In some systems, each conventional frequency may be further configured to carry multiple logical channels via a TDMA protocol, which allows for multiple concurrent calls on each frequency based on the configured slotting ratio of the TDMA channels (e.g., a slotting ratio of 2 allows 2 distinct logical channels, etc.). Each logical channel may comprise a repeating set of a single time slot or of multiple time slots interleaved with the other remaining logical channels. In addition, some systems may provide an additional conventional channel, sometimes identified as a data revert channel, that is reserved for specific data transmissions such as uplink status or location updates, among other possibilities. Subscriber units desiring to transmit such updates may temporarily move away from their assigned group channel to transmit the updates. In still other systems, subscriber units may use other conventional channels that may be assigned to one or more other groups, but are determined to be currently unused by the one or more other groups, to transmit such updates.

In contrast to conventional systems, a trunked radio system and its subscriber units use a pool of traffic channels (e.g., FDMA or TDMA protocols operating on a plurality of available physical frequencies) for virtually an unlimited number of groups of subscriber units (e.g., talkgroups). Thus, all groups are served by all channels. The trunked radio system works to take advantage of the probability that not all groups need a traffic channel for communication at the same time. When a member of a group requests a call on a control or rest channel on which all of the subscriber units in the system idle awaiting new call notifications and other signalling, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber units were idling to a traffic channel for the call, and instruct all subscriber units that are not participating in the new call to move to a newly assigned control or rest channel selected from the pool of available channels. With a given number of channels, a much greater number of groups can be accommodated in a trunked system as compared with conventional radio systems. In a trunked system, a temporarily assigned or a permanently assigned data revert channel may also be provided for subscriber units to individually transmit updates.

Group members for group calls conducted on conventional or trunked systems may be statically or dynamically defined. That is, in a first example, a user or administrator working on behalf of the user may indicate to the switching and/or radio network (perhaps at a call controller, push-to-talk (PTT) server, zone controller, or mobile management entity (MME), base station controller (BSC), mobile switching center (MRC), site controller, Push-to-Talk controller, or other network device) a list of participants of a group at the time of the call or in advance of the call. The group members (e.g., subscriber units) could be provisioned in the network by the user or an agent, and then provided some form of group identity, identifier, or address, for example. Then, at a future time, an originating user in a group may cause some signalling to be transmitted indicating that he or she wishes to establish a communication session (e.g., group call) with each of the pre-designated participants in the defined group. In another example, subscriber units may dynamically affiliate with a group (and also disassociate with the group) perhaps based on user input, and the switching and/or radio network may track group membership and route new group calls according to the current group membership.

Many wireless communication systems, including many LMR systems, provide for non-voice data transmission on one or more separate dedicated data revert channels, or opportunistically on other available (currently unused) voice or data channels. Such data transmission capabilities may be used to periodically or semi-periodically (e.g., intermittently) report location information of subscriber units, determined via a GPS system, triangulation process, or some other method, or to periodically or semi-periodically report other types of data such as status updates or sensor information. Reported status updates may include whether the subscriber unit or user associated with the subscriber unit is working a particular case, is on the clock or not on the clock, is on a walking beat or patrolling in a vehicle, or many other similar or different types of status updates. Reported sensor information may include environmental conditions surrounding the subscriber unit or health conditions (e.g., pulse rate, temperature, oxygen level, breath rate, etc.) of the subscriber unit's user, amongst many other possibilities. Such status, location, and/or sensor information is usually short in nature (e.g., does not require a large amount of bandwidth to transmit, and can normally be transmitted in under one second), but is reported in a periodic or semi-periodic manner so that infrastructure applications, devices, and/or dispatchers can be provided with updated information over time. Other types of short data may be transmitted as well.

As the number of applications that utilize or depend upon such short data transmissions grow, the number and frequency of such transmissions has grown as well. One problem that has arisen with respect to the transmission of short data from subscriber units during group or individual calls is that calls having an excessive duration impair the ability of any one particular subscriber unit participating in the call from reporting such short data. In other words, while a particular subscriber unit is participating in call activity (e.g., receiving voice, audio, or video to and/or from one or more other subscriber units or from one or more infrastructure devices) it is unable to transmit the short data. As a result, applications, devices, and/or dispatchers in the infrastructure relying upon the short data transmissions are starved of new and/or updated data, which could lead to negative consequences, especially in first responder wireless communications systems.

Accordingly, what is needed is an improved method, device, and system for transmitting short data during an active call by a dual watch subscriber unit.

DETAILED DESCRIPTION OF THE INVENTION

Disclosed is an improved method, device, and system for transmitting short data during an active call by a dual watch subscriber unit in a wireless communication system.

In one embodiment, a method of transmitting short data during an active call by a dual watch subscriber unit in a wireless communication system includes: during the active call, detecting, at the subscriber unit, a request to transmit short data, and responsively: transmitting, via a transceiver at the subscriber unit, pending short data on an inbound data channel of an inbound traffic frequency; one of prior to or after transmitting the short data on the inbound data channel, substantially simultaneously receiving: via a first receiver of the transceiver, missed communication media of the active call missed during transmitting of the pending short data on a first outbound channel of a first outbound traffic frequency; and via a second receiver of the transceiver, second communication media of the active call, being transmitted the one of prior to or after the missed communication media of the active call, on a second outbound channel of a second outbound traffic frequency; and playing back media from the missed and the second communication media.

In another embodiment, a dual watch subscriber unit for transmitting short data during an active call in a wireless communication system, the subscriber unit comprising: a speaker; a microphone; a transceiver containing at least a transmitter and a first and second receiver; a processor; and a computer readable medium having instructions stored thereon that, in response to execution by the processor, cause the subscriber unit to perform a set of functions comprising: during the active call, detect a request to transmit short data, and responsively: transmit, via the transceiver, pending short data on an inbound data channel of an inbound traffic frequency; one of prior to or after transmitting the short data on the inbound data channel, substantially simultaneously receive: via the first receiver of the transceiver, missed communication media of the active call missed during transmitting of the pending short data on a first outbound channel of a first outbound traffic frequency; and via the second receiver of the transceiver, second communication media of the active call, being transmitted the one of prior to or after the missed communication media of the active call, on a second outbound channel of a second outbound traffic frequency; and play back media from the missed and the second communication media.

In a still further embodiment, a radio controller in a wireless infrastructure network for receiving short data during an active call from a dual watch subscriber unit in a wireless communication system, the radio controller comprising: a transceiver; a processor; and a computer readable medium having instructions stored thereon that, in response to execution by the processor, cause the subscriber unit to perform a set of functions comprising: receiving, during an active call involving the dual watch subscriber unit, from the first subscriber unit via an inbound data channel of an inbound traffic frequency, short data associated with the first subscriber unit; identifying missed communication media of the active call provided on a first outbound data channel of a first outbound traffic frequency; one of prior to or after receiving the short data on the inbound data channel, substantially simultaneously causing: the missed communication media of the active call missed during transmitting of the pending short data to be transmitted on a first outbound channel of a first outbound traffic frequency; and second communication media of the active call, being transmitted the one of prior to or after the missed communication media of the active call, on a second outbound channel of a second outbound traffic frequency.

Each of the above-mentioned embodiments will be discussed in more detail below, starting with example network and device architectures of systems and devices in which the embodiments may be practiced, followed by a discussion of transmission of short data during an active call by a dual watch subscriber unit from a system perspective, including in particular, processes executed at a radio controller and at subscriber units of the wireless communication system. Further advantages and features consistent with this disclosure will be set forth in the following detailed description, with reference to the figures.

I. Network and Device Architecture

Figure 1:
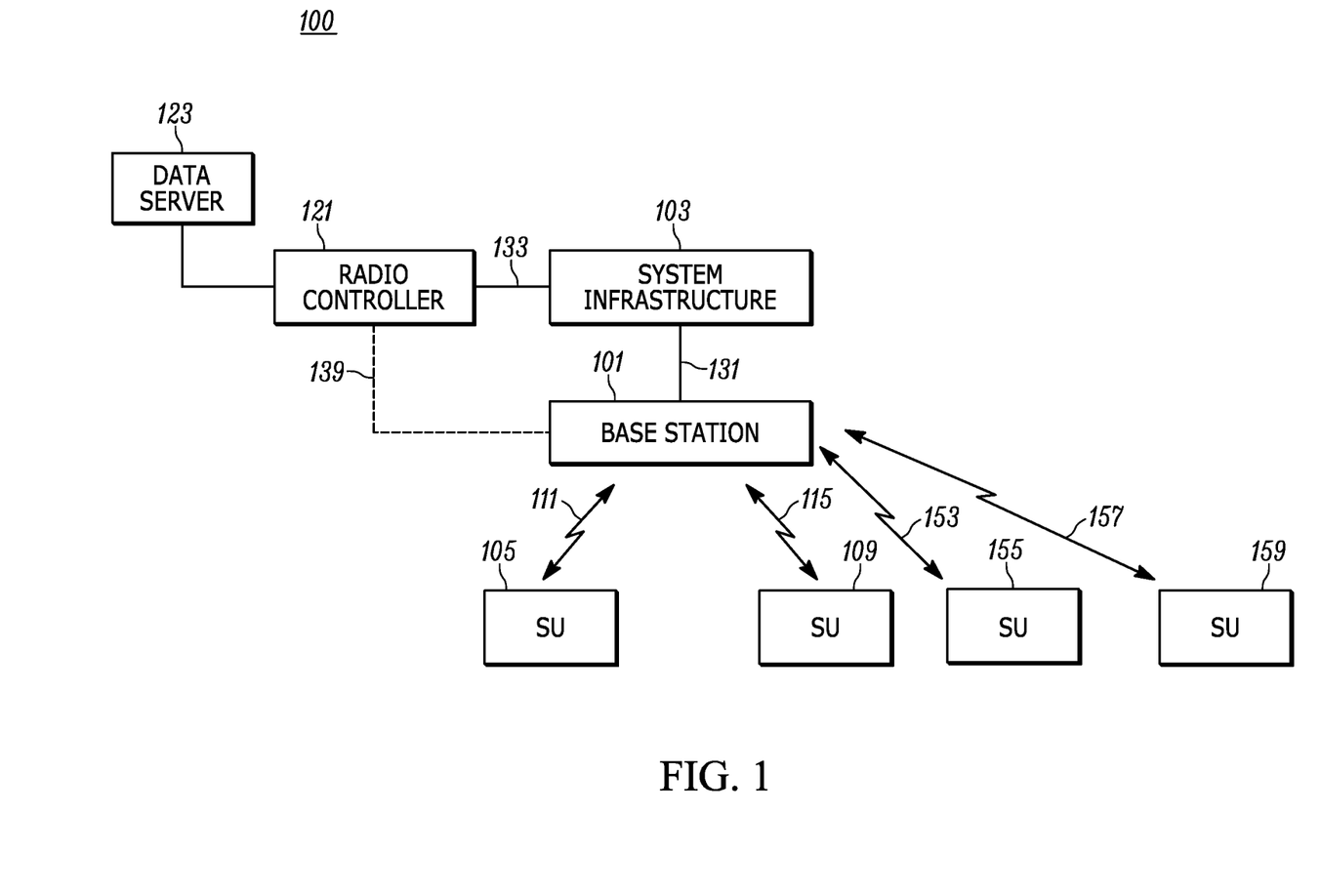
FIG. 1 is a schematic diagram of a wireless communication system in accordance with an embodiment.

FIG. 1 shows a wireless radio communication system 100 that may be adapted in accordance with an embodiment of the disclosure. It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system such as a system capable of operating in accordance with the P25 standard, the TETRA standard, and/or the DMR standard, but may be equally applied to other currently known and/or future standards protocols.

The system 100 shown in FIG. 1 includes one or more base stations 101 operably connected to a system infrastructure 103 via respective wired and/or wireless links 131. As used herein, the term "base station" (BS) refers to any entity that includes one or more transmitters and one or more receivers to perform the functionality of receiving traffic information from one or more signal sources (e.g. subscriber units) and transmitting some or all of the traffic information to one or more signal destinations (e.g, subscriber unit(s), system infrastructure device(s), etc.). For example, the BS 101 may comprise, among other possibilities, a cellular wireless base station, a two-way radio repeater, an IEEE 802-based wireless access point, or other similar device. While, in this description, the BS 101 is described as including at least two sets of transmitters/receivers (e.g., transceivers) providing at least two distinct channel pairs on four distinct respective frequencies, in other embodiments, multiple BSs may provide same or similar functionality and may be disposed at or near one another or may be separated from each other by some distance.

The BS 101 has radio links with a plurality of subscriber units (SUs), particularly SUs in a service cell or site at least partially defined by a geographic location of the BS 101. In addition, BS 101 may maintain a direct wireless or wired link 139 (or indirect link via system infrastructure 103) with a radio controller 121 or other radio network communications device (such as a zone controller). While the radio controller 121 is illustrated as a separate entity in the system 100, in other embodiments, the radio controller 121 may be integrated with other devices (such as a zone controller) in system infrastructure 103 and/or with BS 101. The radio controller 121 may further be configured to provide registration, authentication, encryption, routing, and/or other services to BS 101 so that SUs operating within its coverage area may communicate with other SUs in the system 100. The radio controller 121 may also track or have access to group subscription information that, for each group identifier associated with a particular group of SUs (e.g., a talkgroup), identifies SUs (e.g., by hardware ID, hardware MAC address, IP address, radio ID, International Mobile Subscriber Identity (IMRI), a serial number, or some other unique identifier that can be used to identify subscribed member SUs) that are members of the particular group.

Four SUs 105, 109, 155, 159 are illustrated in FIG. 1 as being within the service area of, and being registered with, BS 101 via respective radio links 111, 115, 153, 157. The radio links 111, 115, 153, 157 may operate according to a conventional or trunked LMR FDMA or TDMA protocol, for example, or some other air-interface protocol. The radio links 111, 115, 153, 157 may represent separate or shared physical channels, and may, for example, comprise at least two sets of channel pairs including a first downlink FDMA or TDMA channel on a first frequency, a first uplink FDMA or TDMA channel paired with the first downlink FDMA or TDMA channel on a second frequency, a second downlink FDMA or TDMA channel on a third frequency, and a second uplink FDMA or TDMA channel paired with the second downlink FDMA or TDMA channel on a fourth frequency. The paired first uplink and first downlink channels may represent a conventional or trunked traffic channel pair assigned for a group call between one or more SUs, and the paired second uplink and second downlink channels may represent a conventional or trunked channel pair assigned as a data revert channel for one or more of the SUs. Additional pairs of FDMA or TDMA channels may exist as well, and additional combinations of additional or alternative group call and data revert channels are possible as well. At least one of the four SUs (i.e., SU 105) is a dual watch SU having one transmitter and at least two separate receivers capable of simultaneous receipt of two separate channels on two separate frequencies in accordance with the description set forth below with respect to FIG. 3.

The BS 101 serves SUs including the SUs 105, 109, 155, 159 with radio communications to and from other terminals, including (i) SUs served by the BS 101, (ii) SUs served by other BSs (not shown), (iii) other terminals including SUs in other systems (not shown) operably linked to the system 100 via the system infrastructure 103, and (iv) other devices communicatively linked to BS 101 such as data server 123, devices in system infrastructure 103, and/or a dispatch console device (not shown).

The system infrastructure 103 includes known sub-systems required for operation of the system 100. Such sub-systems may include, for example, sub-systems providing additional or alternative authentication, routing, registration, location, system management, encryption, and other operational functions within the system 100. The system infrastructure 103 may also provide routes to other BSs providing cells serving other SUs, and/or may provide access to other external types of networks such as the plain old telephone system (POTS) network or a data-switched network such as the Internet. The system infrastructure 103 may also maintain a separate link 133 to the radio controller 121.

Data server 123 may be a storage device and/or application server that stores and/or otherwise processes data provided by SUs, such as location data, status updates, or sensor data. Data stored at the data server 123 may be made available (before or after further processing executed at the data server 123) at a display directly coupled to the data server 123, at SUs in the system 100, or at a console device otherwise coupled to the system infrastructure 103, among other possibilities. While the data server 123 is illustrated as a separate entity in the system 100 communicatively linked with the radio controller 121, in other embodiments, the data server 123 may be integrated with other devices in the system 100 such as the radio controller 121, other devices in the system infrastructure 103 such as a zone controller, and/or may otherwise be accessible via one or more of the external types of networks noted above.

Figure 2:
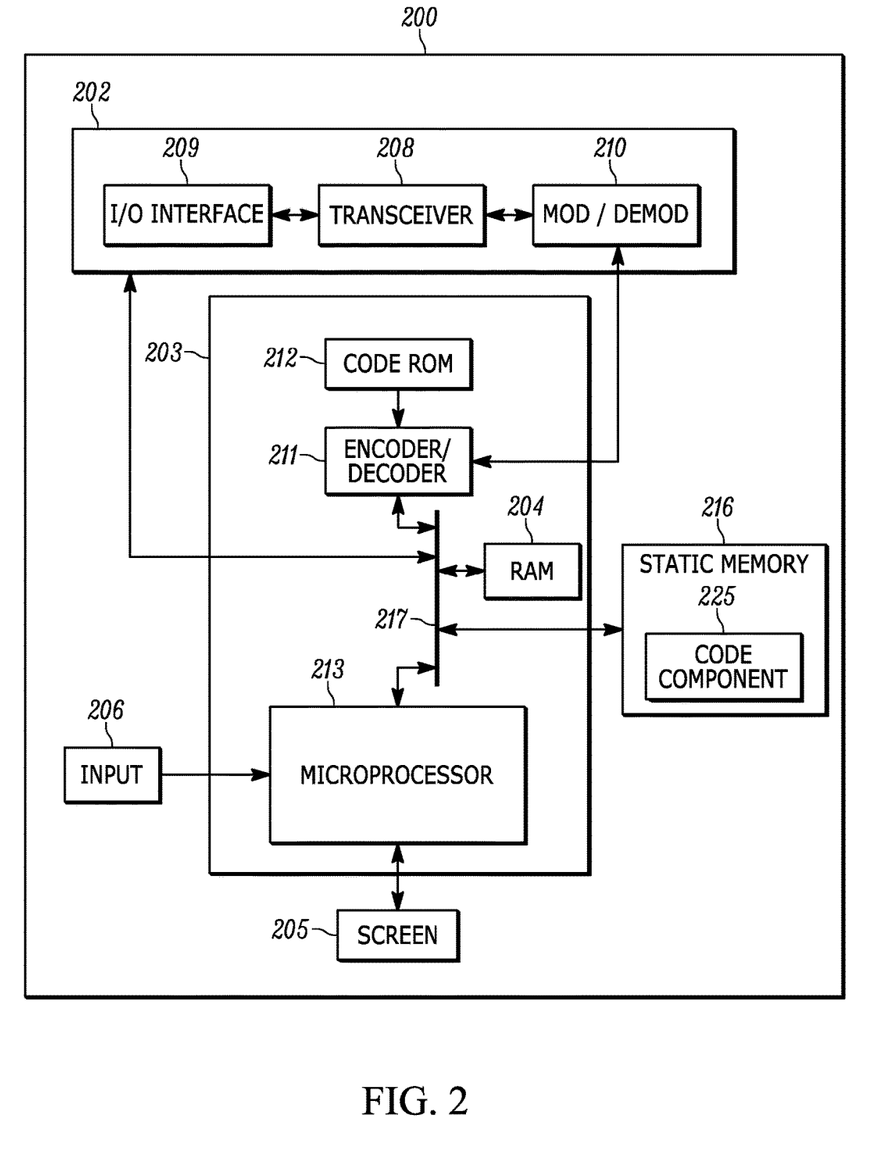
FIG. 2 is a block diagram of an illustrative layout of a radio controller of the system of FIG. 1 in accordance with an embodiment.

FIG. 2 is an example functional block diagram of a radio controller 200. The radio controller 200 may be the same or similar to radio controller 121 operating within the system 100 of FIG. 1 in accordance with some embodiments. As shown in FIG. 2, radio controller 200 includes a communications unit 202 coupled to a common data and address bus 217 of a processing unit 203. The radio controller 200 may also include an input unit (e.g., keypad, pointing device, etc.) 206 and a display screen 205, each coupled to be in communication with the processing unit 203.

The processing unit 203 may include a code Read Only Memory (ROM) 212 coupled to the common data and address bus 217 for storing data for initializing system components. The processing unit 203 may further include a microprocessor 213 coupled, by the common data and address bus 217, a Random Access Memory (RAM) 204, and a static memory 216.

The communications unit 202 may include one or more wired or wireless input/output (I/O) interfaces 209 that are configurable to communicate with SUs such as SUs 105, 109, with BSs such as BS 101, and/or with other devices in or communicably coupled to the system infrastructure 103. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIGS. 4-5 and accompanying text. Static memory 216 may also store, permanently or temporarily, group subscription information that, for each group identifier associated with a particular group of SUs, identifies SUs that are members of the particular group. Additionally or alternatively, static memory 216 may also store, permanently or temporarily, previously transmitted communication media or future to be transmitted communication media of an active call for further transmission as missed communication media in the event that a SU is determined to have missed, or determined that it will miss, transmitted communication media of the active call while transmitting short data. In other embodiments, information disclosed as stored in static memory 216 may additionally or alternatively be stored at an external device such as data server 123 and made accessible to radio controller 200 via communication unit 202. Other types of information could be tracked and/or stored in static memory 216 as well.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
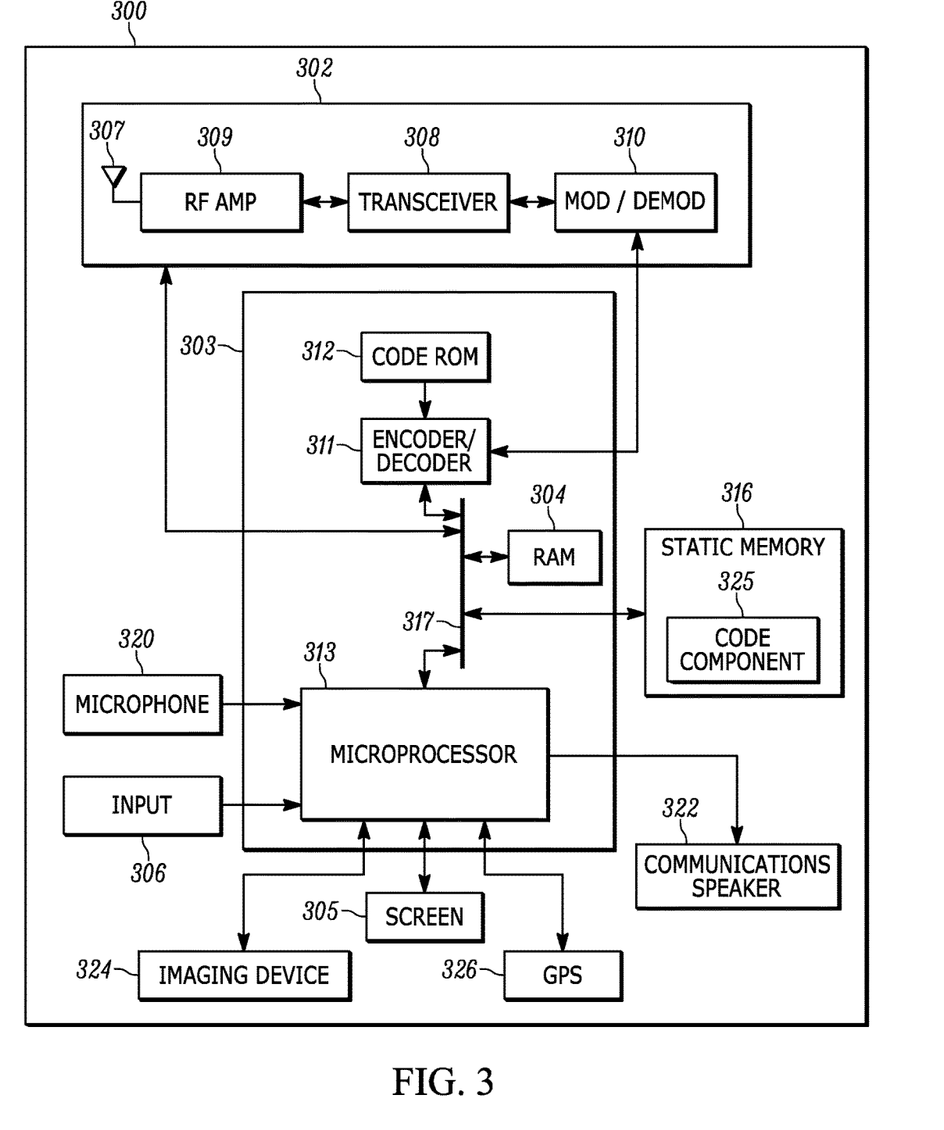
FIG. 3 is a block diagram of an illustrative layout of a subscriber unit of the system of FIG. 1 in accordance with an embodiment.

FIG. 3 is an example functional block diagram of a dual watch SU 300, which may be the same or similar to dual watch SU 105 operating within the system 100 of FIG. 1 in accordance with some embodiments. Other SUs such as SUs 109, 155, and 159 may contain same or similar structures. As shown in FIG. 3, SU 300 comprises a radio frequency communications unit 302 coupled to a common data and address bus 317 of a processing unit 303. The SU 300 may also include an input 306 and a display screen 305, each coupled to be in communication with processing unit 303. A microphone 320 captures audio from a user that is further vocoded by processing unit 303 and transmitted as voice data by communication unit 302 to other SUs or the system infrastructure. A communications speaker 322 reproduces audio that is decoded from voice data transmissions received from other SUs or the system infrastructure via the communications unit 302. Display screen 305 may reproduce image or video data decoded from communication media received from other SUs via the communications unit 302. Imaging device 324 captures image or video data that is further encoded by processing unit 303 and transmitted as communication media by communication unit 302 to other SUs or the system infrastructure. A global positioning system (GPS) receiver 326 receives satellite signals as input and calculates a GPS location as a function of the received signals.

The processing unit 303 may also include a code ROM 312 for storing data for initializing system components. The processing unit 303 may further include a microprocessor 313 coupled, by the common data and address bus 317, a RAM 304, and a static memory 316.

The radio frequency communications unit 302 is a separate or combined receivers and transmitter (or transmitters), e.g., transceiver 308, having a common antenna 307. In some embodiments, additional separate or shared antennas may be provided for each one or more separate transmitter(s) and/or receivers in transceiver 308. The radio frequency communications unit 302 has the transmitter(s) of transceiver 308 coupled to the antenna 307 via a radio frequency amplifier 309. The transceiver 308 may include transmitter(s) and receivers operating in accordance with one or more standard protocols, such as DMR, P25, TETRA, Bluetooth, LTE, Wi-Fi perhaps in accordance with an IEEE 802.11 standard (e.g., 802.11a, 802.11b, 802.11g), WiMAX perhaps operating in accordance with an IEEE 802.16 standard, and/or similar type of protocols configurable to communicate via a wireless network. The transceiver 308 is also coupled to a combined modulator/demodulator 310.

The microprocessor 313 has ports for coupling to the input 306 and to the display screen 305. The microprocessor 313 further has ports for coupling to the microphone 320 and to the speaker 322, and/or other input and output devices. In some embodiments of the present disclosure, the static memory 316 may store operating code for the microprocessor 313 that, when executed by the microprocessor 313, perform one or more of the SU processing, transmitting, and/or receiving steps set forth in FIGS. 4-5 and accompanying text. In still further embodiments, the static memory 316 may store, permanently or temporarily, transmitted communication media of an active call until all previously missed communication media of the active call are received, so that the active call media can be played back in its correct order and without substantial audio holes.

Static memory 316 may comprise, for example, a HDD, an optical disk drives such as a CD drive or DVD drive, a SSD, a tape drive, a flash memory drive, or a tape drive, to name a few.

II. Process of Transmitting Short Data During an Active Call by a Dual Watch Subscriber Unit FIG. 4 sets forth a ladder diagram 400 illustrating processing steps, message transmissions, and message receptions across a SU 402, a BS 404, and a radio controller 406 for transmitting short data during an active call by a dual watch SU in accordance with an embodiment. In general, time progresses from top to bottom with respect to the processing steps, message transmissions, and message receptions of FIG. 4, although some steps, transmissions, and/or receptions may occur simultaneously, but are illustrated separately in time for ease of description. The SU 402 of FIG. 4 may be the same or similar as the SU 300 of FIG. 3 and/or the SU 105 of FIG. 1. The BS 404 of FIG. 4 may be the same or similar as the BS 101 of FIG. 1. And the radio controller 406 of FIG. 4 may be the same or similar as the radio controller 200 of FIG. 2 and/or the radio controller 121 of FIG. 1.

Figure 4:
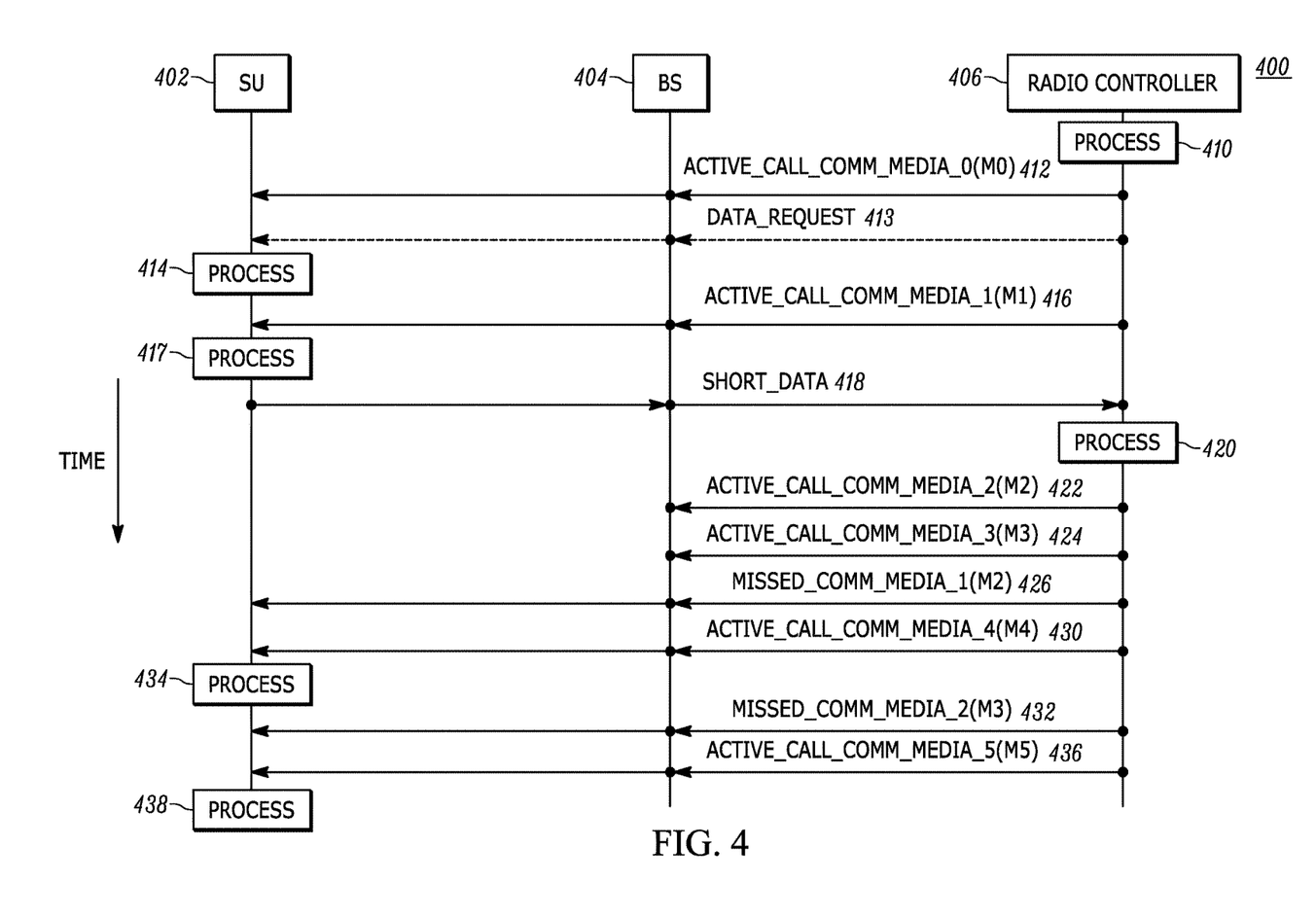
FIG. 4 is a ladder diagram illustrating a process for transmitting short data during an active call by a dual watch subscriber unit in accordance with an embodiment.
Figure 5:
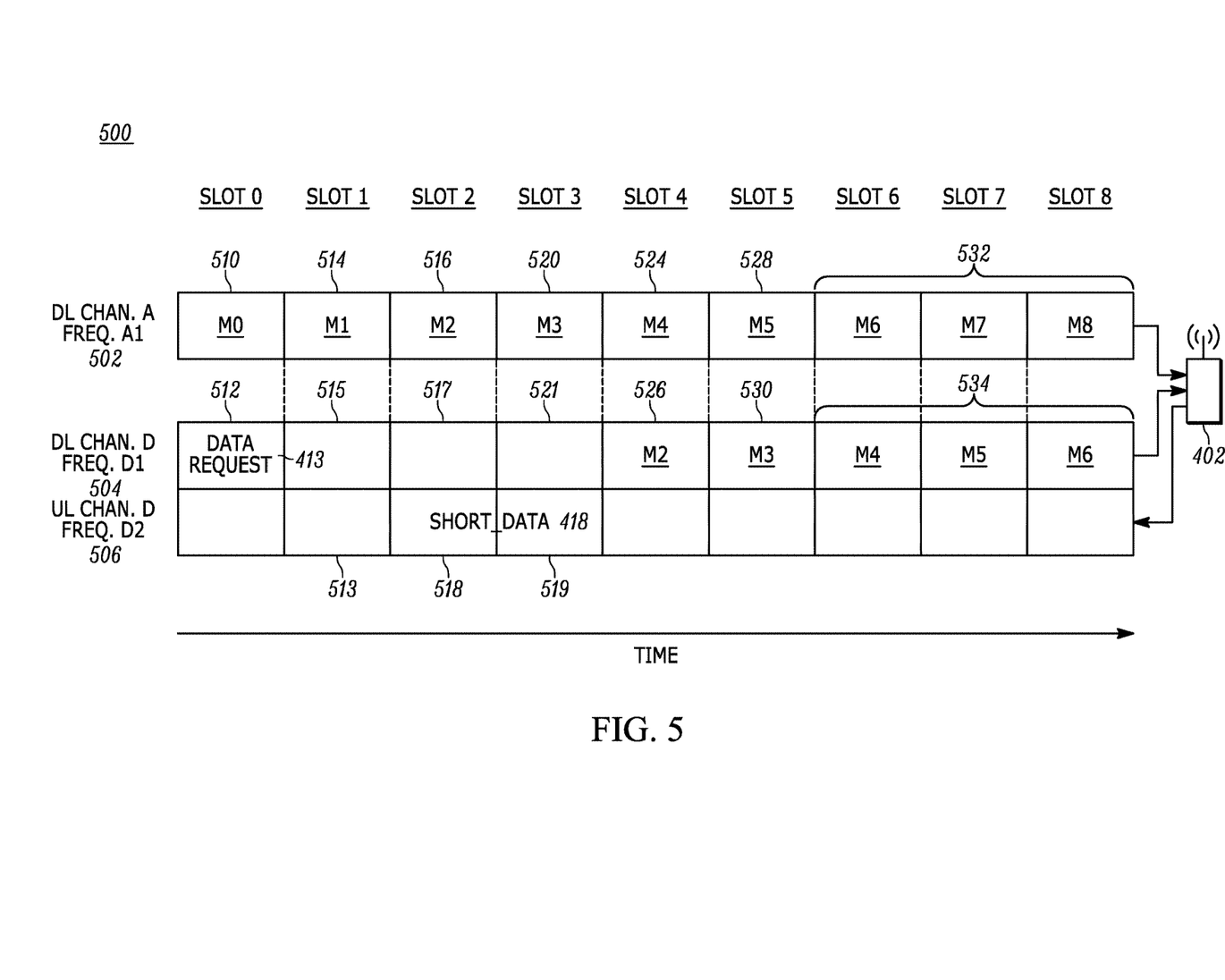
FIG. 5 is a timing diagram of a process for transmitting short data during an active call by a dual watch subscriber unit in accordance with an embodiment.

FIG. 5 sets forth an example-timing diagram 500 illustrating a relative timing of transmissions and receptions sets forth in FIG. 4 in an FDMA system in which two channel pairs are time-aligned, in accordance with an embodiment. Same or similar considerations may be applied to a TDMA system. Although the channels are time-aligned and slot-aligned in FIG. 5 for ease of description, time-alignment and slot-alignment is not necessary and, in other embodiments, the channel pairs may not be time-aligned and/or may not be slot-aligned.

FIGS. 4 and 5 will be described in a combined fashion without repeatedly distinguishing between the figures, such that any reference character beginning with a four ("4") should be interpreted as referring to FIG. 4 and any reference character beginning with a five ("5") should be interpreted as referring to FIG. 5. And while FIGS. 4 and 5 will be described together for ease of description, each figure is intended to also stand on its own and should not be considered limiting on what the other figure discloses. For example, similar considerations as set forth in FIG. 4 can be similarly applied to other FDMA or other TDMA systems and/or implementing other FDMA or TDMA protocols than that set forth in FIG. 5. Other variations are possible as well.

In FIG. 5, time progresses left to right with respect to a downlink (DL) channel A 502 operating on a first frequency A1 on which a first downlink channel appears. Uplink (UL) channel A, paired with DL channel A 508, is not shown solely for ease of illustration. In some embodiments, the UL channel A may be used by another initiating/transmitting SU to transmit the communication media illustrated on the DL channel A 502. In still other embodiments, the UL channel A may be unused if the communication media is being sourced from the infrastructure 103 or another communication system communicatively linked to communication system 100. Although no signalling space is illustrated in FIG. 5, in various embodiments, such signalling space may occur in between slots and/or frames or at other designated times on a channel.

FIGS. 4 and 5 illustrate a call scenario that may be either an individual call or a group call. SU 402 is illustrated as receiving an active call from the system infrastructure (via radio controller 406 and BS 404 in this example) that may be originally sourced from any one of SUs 109, 155, and 159 transmitting on UL channel A, and which may be destined for the individual SU 402 or a talkgroup to which SU 402 subscribes or is otherwise associated. In other embodiments, the active call may originate from a dispatch console communicatively linked to radio controller 121 and/or system infrastructure 103, and/or from another communication system communicatively linked to radio controller 121 and/or system infrastructure 103.

In addition to DL channel A 502 and UL channel A, a separate pair of uplink and downlink channels, including DL channel D 504 and UL channel D 506 are provided. While the DL channel D 504 operating on frequency D1 and the UL channel D 506 operating on frequency D2 (different from D1 and different from A1) are described below as a dedicated data channel pair, perhaps making up a dedicated data revert channel in the communication system 100, in other embodiments, the pair of channels 504, 506 may be a conventional or trunked traffic channel normally available for assigning group or individual calls but which is temporarily used and/or assigned by the radio controller 406 for short data transmission. In still further embodiments, the DL channel D 504 and the UL channel D 506 may not be paired but may instead be individually and separately assigned for the short data transmission purposes and the missing communication media transmission purposes set forth herein. Other possibilities exist as well. In any event, and as illustrated at the right hand side of FIG. 5, a first receiver and a second receiver of SU 402 may be configured to separately monitor DL channel A 502 and DL channel D 504, and a transmitter of SU 402 may be configured to transmit short data on UL channel D 506, among other available DL and UL channels.

Additional processing steps, receptions, and/or transmissions not disclosed herein could be additionally added before, after, or in-between steps, receptions, and/or transmissions disclosed in FIGS. 4 and 5, and the presence of such additional steps, receptions, and/or transmissions would not negate the purpose and advantages of the examples set forth in detail throughout the remainder of this disclosure. Furthermore, while a particular order of processing steps, message receptions, and/or message transmissions is indicated in FIGS. 4 and 5 for exemplary purposes, timing and ordering of such steps, receptions, and transmissions may vary where appropriate without negating the purpose and advantages of the examples set forth in detail throughout the remainder of this disclosure. Finally, and as already noted above with respect to FIG. 1, while in this example the DL channel A 502 frequency A1, the DL channel D 504 frequency D1, and the UL channel D 506 frequency D2 are illustrated in FIG. 4 as being handled by a same BS 404, in other embodiments, separate BSs may handle the DL channel A 502 frequency A1, the DL channel D 504 frequency D1, and/or the UL channel D 506 frequency D2 and each may separately interface with radio controller 406.

As illustrated in FIG. 4, during an already active call, radio controller 406 receives communication media from a source SU or a source infrastructure device, processes the communication media at step 410, and forwards the communication media to SU 402 as a target destination of the communication media via BS 404 as active_call_comm_media_0 (M0) 412. The active_call_comm_media_0 (M0) 412 transmission may correspond, for example, to communication media M0 transmitted in slot 0 510 of the DL channel A 502 on downlink frequency A1 in FIG. 5. Communication media M0 may have been received on the UL channel A frequency (not shown) from another SU in a slot of a prior superframe before slot 0 510, or may have been received from an infrastructure device via a wired connection, among other possibilities.

In some embodiments, and also at step 410, the radio controller 406 may determine that SU 402 should transmit short data. The radio controller may determine that SU 402 should transmit short data based on a number or combination of parameters, including but not limited to a threshold amount of time passing since it last received a status update, a location update, or sensor information update from SU 402 (e.g., such as 30 seconds-30 minutes), a request being received from a console device requesting updated status, location, or sensor information from SU 402, a priority of the SU 402 relative to other SUs known to radio controller 406, a priority of a group to which SU 402 is subscribed relative to other groups of SUs, or some other reason or condition. In response to the determination, the radio controller 406 generates a request message and transmits the request message to the SU 402 as data_request message 413. In some embodiments, the data_request message 413 may request that the SU 402 transmit an indicated or implied type of short data immediately, at a next available opportunity, or at a scheduled time in the future (e.g., the radio controller 406 may schedule the SU's 402 transmission of short data at some time in the future in accordance with an availability of the UL channel D 506 and/or other inbound channels, and in accordance with prior scheduled short data transmissions of other SUs, and the request may indicate a future time on the UL channel D 506 and/or other inbound channels during which to transmit). The type of short data being requested may be a status, location, or sensor information, and may be indicated in the request, or may be implied upon receipt of the request based on mere receipt of the request or based on other information in the request. Furthermore, the data_request message 413 message may specify the particular UL channel and/or UL frequency on which to transmit the short data by channel frequency, by channel slot, by channel identifier, by other channel parameter, and/or by index number, among other possibilities. As part of the process of identifying UL channel D 506, the radio controller 406 may select a reserved revert channel (such as channel pair 504, 506), or may identify one or more idle conventional or trunked traffic channels for temporary use for short data and missed communication media transmission purposes, and indicate the identified channel or channels in the data_request message 413.

The data_request message 413 may be transmitted in a time slot 512 (or, in other embodiments, slot 515) of the DL channel D 504, assuming it is available. Additionally or alternatively, the data_request message 413 may be embedded in the active_call_comm_media_0 (M0) 412 transmitted in slot 0 510 of DL channel A 502 or embedded in the active_call_comm_media_1 (M1) 416 transmitted in slot 1 514 of DL channel A 502.

The SU 402 may thus not only be configured to receive active call communication media on the DL channel A 502 of the outbound frequency A1 (via a first receiver), but may also be configured to monitor an additional DL channel D 504 on the outbound frequency D1 (simultaneously via a second receiver) for signalling such as the data_request message 413 or, as described in more detail below, for missed communication media.

The data_request message 413 may identify SU 402 by its unique SU identifier or by an assigned index number, or may set forth a schedule and mapping that sets forth, for each of a plurality of SUs (which may include all SUs in a same talkgroup as SU 402 for the active call), a schedule for transmitting short data on the UL channel D 506 during the active call.

At step 414, the SU 402 receives the active_call_comm_media_0 412 message, processes the message and determines that it is an intended recipient (for a group call) or the intended recipient (for an individual call) of the message, extracts media information, such as voice, audio, video, image, or text from the message, and plays back the media (e.g., via a speaker for audio or voice and/or a display for image, video, or text). Also at step 414, the SU 402 detects a request to transmit short data.

Detecting the request to transmit short data may include detecting expiration of a periodic or semi-periodic timer that determines an interval at which to capture and/or transmit short data such as current location data, status data, or sensor data, detecting a user input associated with a request to capture and/or transmit such short data, detecting a change in distance from a previously reported location greater than a threshold amount, or detecting receipt of an instruction or request to capture and/or transmit short data such as current location data or sensor data (including but not limited to the data_request message 413 described above).

Responsive to detecting the request to transmit short data at step 414, and in this example after receiving the next communication media active_call_comm_media_1 (M1) 416 in slot 2 514 of the DL channel A 502 (including processing and playing back the media at step 417 in a same or similar manner to that set forth at step 414), SU 402 switches to the UL channel D 506 (e.g., a pre-defined data revert channel) of pre-configured frequency D2, or in some embodiments switches to the UL channel D 506 indicated in the data_request message 413, and transmits short_data 418 via BS 404 to radio controller 406 in slots 2 518 and 3 519 of the UL channel D 506 (for further storage and/or distribution by radio controller 406 and/or a data server communicatively coupled to the radio controller 406). In other embodiments, the SU 402 could switch to UL channel D 506 immediately after detecting the short data request and start transmitting in slot 1 513 of UL channel D 506. Other timing variations exist as well.

In the embodiment illustrated in FIG. 5, because the DL channel A 502, DL channel D 504, and UL channel D 506 are time-aligned, SU 402 may begin transmitting its short_data 418 during slot 2 518 of the UL channel D 506 as illustrated, without separately obtaining synchronization via other signalling mechanisms. In other embodiments in which the channels are not time-aligned, the SU 402 may monitor the DL channel D 504 and/or the UL channel D 506 to obtain sync before transmitting the short_data 418, or may transmit its own synchronization information so that the receiving BS 404 may synchronize to the SU 402. Other examples are possible as well.

As shown in FIGS. 4 and 5, while the SU 402 is transmitting the short_data 418, the radio controller 406 causes communication media of the active call (active_call_comm_media_2 422 and active_call_comm_media_3 424) to be broadcast on the DL channel A 502 during slots 516 and 520, respectively. Because the SU 404 is transmitting on the UL channel D 506, it cannot receive the active_call_comm_media_2 (M2) 422 and active_call_comm_media_3 (M3) 424 transmitted in slots 2 516 and 3 520 of the DL channel A 502 due to receiver desense.

In this example in which short data sufficient to fit in two single slots (slots 2 518 and 3 519) is transmitted by SU 402, SU 402 subsequently returns to (or again receives on) the DL channel A 502 to receive the active_call_comm_media_4 (M4) 430 in slot 4 524 of the active call, and thus is only away from or unable to receive active call communication media on the DL channel A 502 for the time period during slots 2 and 3 of FIG. 5.

At step 420, the radio controller 406 receives the short_data 418, extracts data (e.g., such as status, location, or sensor data) from the short_data 418 message, and processes, stores, and/or otherwise further distributes the data, perhaps with the aid of a data server such as data server 123 of FIG. 1. Also at step 420, the radio controller 406 determines and/or identifies communication media of the active call that the SU 402 missed during transmission of the short_data 418. The determination and/or identification of communication media missed could be performed in a number of ways. For example, the radio controller 406 may determine an actual transmission time for the SU 402 to transmit the short_data 418 (perhaps using time stamps or other information provided to it by BS 404), and map the transmit time to transmit times of previously transmitted communication media (M2 and M3 in slots 2 516 and 3 520 of the DL channel A 502 for the active call in this example) so as to identify the active_call_comm_media_2 (M2) 422 and active_call_comm_media_3 (M3) 424 as missed by the SU 406 during the determined transmit times. In other embodiments, the radio controller 406 may be pre-configured with an expected transmission time period to transmit a corresponding short data update, and given a scheduled time to begin transmitting the short_data 418 that may be provided in the data_request message 413, maps the expected transmit time to current or future actual transmitted communication media times so as to similarly identify the active_call_comm_media_2 (M2) 422 and active_call_comm_media_3 (M3) 424 as missed by the SU 402. Other possibilities exist as well.

Advantageously, the radio controller 406 can make the determination of what communication media SU 402 missed on its own, and may automatically provide the determined missed communication media to SU 402 without requiring SU 402 to separately request re-transmission of missed communication media, saving additional time and bandwidth and ensuring a more artefact-free reproduction of media at the SU 402 despite its intervening transmission of short data. In some embodiments, the BS 404 may store each active_call_comm_media message for a period of time, and the radio controller 406 may, at the times indicated in FIGS. 4 and 5, simply transmit an instruction to BS 404 to re-transmit the identified message in an identified slot or slots.

In some embodiments, the SU 402 may transmit, separately or embedded in the short_data 418, a request to re-transmit any missed communication media that the SU 402 missed on the DL channel D 504 during transmitting of the short_data 418, without specifically identifying the missed communication media. For example, the SU 402 may determine a voice quality of voice data received in prior communication media and, only responsive to determining that the voice quality is below a threshold level, determine to transmit the request to re-transmit missed communication media. In this example, missed communication media may not be automatically sent by the radio controller 406, but only upon receipt of the request embedded in, or transmitted along-side, the short_data 418.

Subsequently, and as a result of the determination and/or identification of missed communication media at step 420, the radio controller 406 provides a first one of the missed communication media (missed_comm_media_1 (M2) 426) in slot 4 526 of the DL channel D 504, which the SU 402 receives via a first one of its plurality of receivers. Substantially simultaneously, the radio controller 406 also provides the next active_call_comm_media_4 (M4) 430 in the active call in slot 4 524 of the DL channel A 502, which the SU 402 receives via a second one of its plurality of receivers. As noted above, while FIG. 5 illustrates DL channel A 502 as being time-aligned as DL channel D 504, such time-alignment is not necessary, and the transmission of the missed_comm_media_1 (M2) 426 in slot 4 526 of the DL channel D may partially overlap with (but not entirely overlap with) the transmission of active_call_comm_media_4 (M4) 430 in slot 4 524 of the DL channel A 502.

At step 434, the SU 402 receives the active_call_comm_media_4 (M4) 430 message and the missed_comm_media_1 (M2) 426 message, processes the messages and determines that it is an or the intended recipient of the messages, extracts media information from the messages, and delays playback of the media as a result of a determination, from the time away from the DL channel A 502 or from an order indicator in one or both of the active_call_comm_media_4 (M4) 430 message and the missed_comm_media_1 (M2) 426 message, that it is still missing communication media for the active call.

Subsequently, and again as a result of the determination and/or identification of missed communication media at step 420, the radio controller 406 provides a second one of the missed communication media (missed_comm_media_2 (M3) 432) in slot 5 530 of the DL channel D 504, which the SU 402 receives via a first one of its plurality of receivers. Substantially simultaneously, the radio controller 406 also provides the next active_call_comm_media_5 (M5) 436 in the active call in slot 5 528 of the DL channel A 502, which the SU 402 receives via a second one of its plurality of receivers.

At step 438, the SU 402 receives the active_call_comm_media_5 (M5) 436 message and the missed_comm_media_2 (M3) 432 message, processes the messages and determines that it is an or the intended recipient of the messages, extracts media information from the messages, and determines, from the time away from the DL channel A 502 or from an order indicator in one or both of the active_call_comm_media_4 (M4) 430 message and the missed_comm_media_1 (M2) 426 message, that it has received the missing communication media for the active call in its entirety. At this point, the SU 402 can re-order the received communication media into its proper order, and play back the received active call and missed communication media.

After step 438, the SU 402 returns to normal call processing by receiving subsequent communication media for the active call in slots 6-8 532 on DL channel A 502, the assigned downlink channel for the active call. While the SU 402 no longer needs any more missed communication media via DL channel D 504, in some embodiments, it may continue to monitor the channel for future data requests. Furthermore, in some embodiments, the radio controller 406 may continue to provide subsequent communication media in subsequent slots 534 of the DL channel D 504 in the event the radio controller 406 determines that other SUs need such additional missed communication media following those specifically provided for SU 402.

Although a particular sequence was illustrated in FIGS. 4-5 for transmitting short data during an active call by a dual watch SU, many variations of that sequence may occur without affecting the advantages and benefits of the underlying process.

For example, although two slots worth of short data was illustrated as being transmitted on the UL channel D 506 in FIG. 5, amounting to approximately 12-14 bytes of data per slot (that given a location or data sensor size of 6-12 bytes amounts to approximately 1-2 short data updates per slot), the SU 402 may transmit larger or smaller amounts of short data across more than two slots or less than two slots of the UL channel D 506, potentially missing more or less than two communication media transmissions of the active call on the DL channel A 502, and subsequently receiving more or less than two missed communication media transmissions on the DL channel D 504.

In still other embodiments, the radio controller 406 may have access to communication media one or more slots prior to when the communication media is provided on the assigned DL channel A 502 for the active call. As a result, in embodiments in which the radio controller 406 schedules or instructs the SU 402 to transmit short data and thus may know in head of time when and perhaps for how long the SU 402 will be away from the assigned active call DL channel A 502, the radio controller 506 may provide some or all of the determined missed communication media on the DL channel D 504 prior to the SU 402 transmitting the short_data 418 on the UL channel D 506. More specifically, one or more of the steps set forth above as being executed at the radio controller 406 at step 420 may instead be executed at an earlier step (e.g., step 410), and the missed communication media provided to the SU 402 in advance of the time for the scheduled or instructed time for the SU 402 to transmit the short_data 418. As one example, the radio controller 406 may determine at step 410 that it will schedule SU 402 to transmit short_data 418 during slots 2 518 and 3 519 of the UL channel D 504, and thus provide the predicted missed communication media (missed_comm_media_1 (M2) 426 and missed_comm_media_2 (M3) 432) in respective prior-to-short-data-transmission slots 512 and 515 of the DL channel D 504. In this latter case, the data_request message 413 may be either transmitted to the SU 402 in an earlier slot (not shown) of the DL channel D 504 or may be embedded in one or both of the missed_comm_media_1 (M2) 426 and missed_comm_media_2 (M3) 432 messages. By providing the missed communication media on the second DL channel D 504 substantially simultaneously with the normal active call communication media on the assigned first DL channel A 502, the SU 402 gains the capability to avoid audio holes or delays by buffering the earlier provided missed communication media messages 426, 432, extracting the media information, such as voice, audio, video, image, or text from the messages, and then playing back the media while transmitting the short_data 418 (and not receiving any active call communication media from DL channel A 502 during the short data transmission). In still further embodiments, the missed communication media may be split such that some of the missed communication media is provided to the SU 402 prior to the transmission of the short_data 418, and the remaining missed communication media is provided after the transmission of the short_data 418.

III. Conclusion

In accordance with the foregoing, an improved method, apparatus, and system for transmitting short data during an active call by a dual watch subscriber unit in a wireless communication system. As a result, SUs in groups experiencing high voice activity are still able to make periodic, semi-periodic, or intermittent transmissions of data, preventing infrastructure applications relying upon such data from being starved of information that may be critical to the safety and well-being of SU users. Other advantages and benefits are possible as well.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of transmitting short data during an active call by a dual watch subscriber unit in a wireless communication system, the method comprising:
   during the active call, detecting, at the subscriber unit, a request to transmit short data, and responsively:
      transmitting, via a wireless transceiver at the subscriber unit, pending short data on an inbound data channel of an inbound wireless traffic frequency;
      one of prior to or after transmitting the short data on the inbound data channel, substantially simultaneously receiving:
         via a first wireless receiver of the wireless transceiver, missed communication media of the active call missed during transmitting of the pending short data on a first outbound channel of a first wireless outbound traffic frequency different from the inbound wireless traffic frequency; and
         via a second wireless receiver of the wireless transceiver different from the first wireless receiver, second communication media of the active call, being transmitted the one of prior to or after the missed communication media of the active call, on a second outbound channel of a second wireless outbound traffic frequency different from the inbound wireless traffic frequency and different from the first wireless outbound traffic frequency; and
      playing back media from the missed and the second communication media.

2. The method of claim 1, wherein the missed communication media is received after transmitting the short data on the inbound data channel, the method further comprising buffering the second communication media until the missed communication media is received in its entirety.

3. The method of claim 1, wherein the missed communication media is received prior to transmitting the short data on the inbound data channel, the method further comprising buffering the missed communication media and playing back the missed communication media while transmitting the short data.

4. The method of claim 1, wherein the missed communication media is received on the first outbound channel without the subscriber unit specifically identifying the missed communication media in any request for re-transmission of missed communication media.

5. The method of claim 1, wherein the inbound data channel and the first outbound data channel comprise a dedicated data channel pair.

6. The method of claim 1, further comprising, after receiving the missed communication media, continuing to receive the active call only via the second wireless receiver and second outbound channel and continuing to monitor the first outbound channel via the first wireless receiver for subsequent requests to transmit short data.

7. The method of claim 1, wherein detecting, at the subscriber unit, a request to transmit short data comprises receiving a request from the infrastructure to transmit the short data on the inbound data channel.

8. The method of claim 7, wherein the request identifies the inbound data channel on which to transmit the short data.

9. The method of claim 7, wherein the request identifies a future time at which to transmit the short data.

10. The method of claim 1, further comprising transmitting on the inbound data channel, a request to re-transmit any missed communication media that the subscriber unit missed during transmitting of the pending short data, on the first outbound channel, without specifically identifying the missed communication media.

11. The method of claim 10, further comprising determining a voice quality of voice data received in prior communication media and responsive to determining that the voice quality is below a threshold level, determining to transmit the request to re-transmit.

12. The method of claim 1, wherein the short data is one of a status update of the subscriber unit and sensor data associated with a user of the subscriber unit.

13. The method of claim 1, wherein the short data is a location update of the subscriber unit.

14. The method of claim 1, wherein detecting, at the subscriber unit, the request to transmit short data comprises determining that a threshold period of time has passed since a last short data transmission has been sent or that a threshold distance has been traveled since the last short data transmission has been sent.

15. The method of claim 1, wherein detecting, at the subscriber unit, the request to transmit short data comprises detecting activation, via an input interface of the subscriber unit, of a request to transmit the short data.

16. A dual watch subscriber unit for transmitting short data during an active call in a wireless communication system, the subscriber unit comprising:
   a speaker;
   a microphone;
   a wireless transceiver containing at least a wireless transmitter and a-first and second wireless receivers;
   a processor; and
   a computer readable medium having instructions stored thereon that, in response to execution by the processor, cause the subscriber unit to perform a set of functions comprising:
      during the active call, detect a request to transmit short data, and responsively:
         transmit, via the wireless transceiver, pending short data on an inbound data channel of an inbound wireless traffic frequency;
         one of prior to or after transmitting the short data on the inbound data channel, substantially simultaneously receive:
            via the first wireless receiver of the wireless transceiver, missed communication media of the active call missed during transmitting of the pending short data on a first outbound channel of a first wireless outbound traffic frequency different from the inbound wireless traffic frequency; and via the second wireless receiver of the wireless transceiver different from the first wireless receiver, second communication media of the active call, being transmitted the one of prior to or after the missed communication media of the active call, on a second wireless outbound channel of a second outbound traffic frequency different from the inbound wireless traffic frequency and different from the first wireless outbound traffic frequency; and play back media from the missed and the second communication media.

17. The subscriber unit of claim 16, wherein the missed communication media is received after transmitting the short data on the inbound data channel, the set of functions further comprising buffer the second communication media until the missed communication media is received in its entirety.

18. The subscriber unit of claim 16, wherein the missed communication media is received prior to transmitting the short data on the inbound data channel, the set of functions further comprising buffer the missed communication media and play back the missed communication media while transmitting the short data.

19. A radio controller in a wireless infrastructure network for receiving short data during an active call from a dual watch subscriber unit in a wireless communication system, the radio controller comprising:
   a transceiver;
   a processor; and
   a computer readable medium having instructions stored thereon that, in response to execution by the processor, cause the radio controller to perform a set of functions comprising:
      receiving, during an active call involving the dual watch subscriber unit, from the dual watch subscriber unit via an inbound data channel of an inbound wireless traffic frequency, short data associated with the dual watch subscriber unit;
      identifying missed communication media of the active call provided on a first outbound data channel of a first wireless outbound traffic frequency;
      one of prior to or after receiving the short data on the inbound data channel, substantially simultaneously causing:
         the missed communication media of the active call missed during transmitting of the pending short data to be transmitted to the dual watch subscriber unit on a first outbound channel of a first wireless outbound traffic frequency different from the inbound wireless traffic frequency; and
         second communication media of the active call, being transmitted the one of prior to or after the missed communication media of the active call, on a second outbound channel of a second wireless outbound traffic frequency different from the inbound wireless traffic frequency and different from the first wireless outbound traffic frequency.

20. The radio controller of claim 19, further comprising, prior to receiving the short data associated with the first subscriber unit, causing a request to transmit short data to be transmitted to the first subscriber unit on the first outbound channel.

* * * * *